Dec. 29, 1931.  W. O. EDDY  1,838,919
DEHYDRATOR HAVING ROTATABLE EMULSION DISTRIBUTOR
Filed Dec. 1, 1926
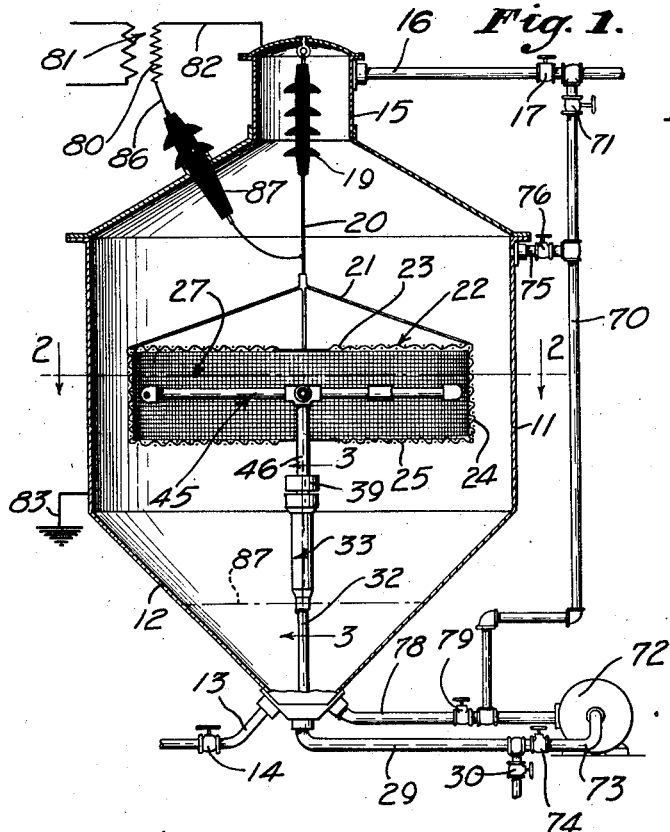
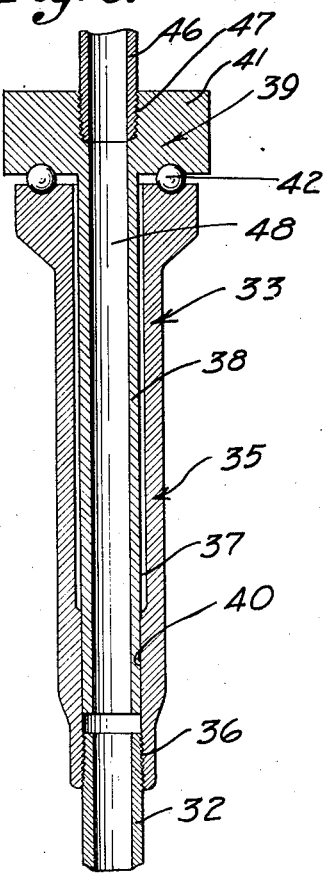
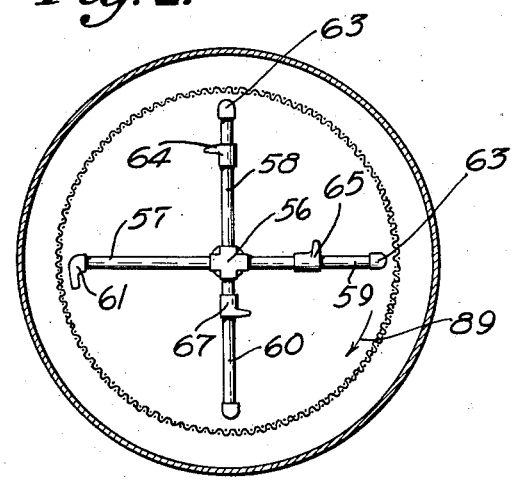
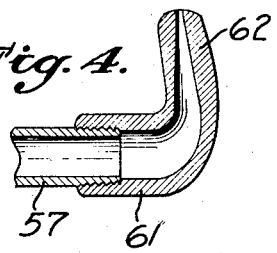
INVENTOR:
WILLIAM O. EDDY
BY
ATTORNEY.

Patented Dec. 29, 1931

1,838,919

UNITED STATES PATENT OFFICE

WILLIAM O. EDDY, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

DEHYDRATOR HAVING ROTATABLE EMULSION DISTRIBUTOR

Application filed December 1, 1926. Serial No. 151,916.

My invention relates to the art of dehydrating oils and is particularly applicable to the dehydration of petroleum oil by the so-called electrical process.

In this process the emulsions which consist of fine particles of water carried in the body of the petroleum are subjected to the action of a high potential alternating electric field which tends to agglomerate the fine particles in the emulsion into masses of water which readily settle from the oil under the influence of gravity. It is a well known fact that certain emulsions which contain only very fine water particles are extremely difficult to separate by the electrical process. I have discovered that difficult emulsions, as they are called, may be thoroughly dehydrated if the emulsions are agitated in the treating space and while subjected to the electric field.

It is accordingly an object of this invention to provide an electrical dehydrator in which the emulsion is agitated in the treating space.

A further object of the invention is to provide a dehydrator in which emulsion is equally distributed to all parts of the treating space.

It has been demonstrated that emulsion is quicker and better treated if it is subjected to the action of an electric field which has pulsating tendencies from a maximum to a minimum so that at intervals the emulsion is subjected to a very high potential field and at other intervals is subjected to only a low potential field. I have found that an electric field of this character is obtained by providing a rotating field in the treating space.

It is accordingly one of the objects of this invention to provide an electrical dehydrator in which a revolving field is set up in the treating space.

A further object of this invention is to provide an electrical dehydrator in which one of the electrodes is revolved in the treating space.

There are certain emulsions which are difficult to treat because they are so heavy and there are other emulsions which are difficult to treat because they contain substantially no free water to carry the electrical charge. I have found that by use of a reflux or a back feed of treated oil or partially treated oil or water from the dehydrator into the incoming oil that the treatment of these difficult oils is made quite easy.

It is accordingly an object of the invention to provide an electrical dehydrator in which partly clean oil or water may be withdrawn from the tank and mixed with the emulsion to be treated in order to condition the emulsion for treatment.

A further object of the invention is to provide a novel method of treating an emulsion by mixing therewith one of the constituents of the emulsion and subjecting this mixture to the action of an electric field.

Other objects and advantages of the invention will be made evident hereinafter.

Referring to the drawing in which I illustrate a preferred form of the invention, Fig. 1 is a vertical cross section.

Fig. 2 is a horizontal cross section taken on the line 2—2 of Fig. 1.

Fig. 3 is an enlarged section taken on the line 3—3 of Fig. 1.

Fig. 4 is an enlarged sectional view showing a nozzle employed in the invention.

Referring in detail to the drawing, the dehydrator has a tank 11. The lower end of the tank 11 is provided in the form of a cone 12 to the lower end of which a water drain pipe 13 is attached, this water drain pipe 13 having a valve 14. The upper part of the tank 11 has a dome 15 to which a clean oil take-off pipe 16 having a valve 17 is connected.

Supported in the upper part of the tank 11 is an insulator 19 to which a rod 20 is secured. The rod 20 has arms 21 attached to the lower end thereof which support a primary or live electrode 22. The live electrode 22 is formed preferably from coarse wire mesh as shown and consists of an upper wall 23, a cylindrical wall 24, and a lower wall 25. The walls 23, 24, and 25 cooperate to provide a substantially electrically closed treating space 27.

Connected to the lower part of the cone 12 is an emulsion inlet pipe 29 having a valve 30. The pipe 29 has a vertical leg 32 which extends upward along the axis of the tank 11. Supported at the upper end of the vertical leg 32 is a bearing structure 33. The bearing structure 33 is shown in detail in Fig. 3 and has a body 35 which is threadedly attached at 36 to the upper end of the leg 32. The body 35 has an opening 37 formed therethrough into which a tube 38 of a spindle 39 extends. The lower end of the tube 38 is extended into a bearing portion 40 of the body 35. The upper end of the spindle 39 is provided with a head 41. Placed between the head 41 and the upper end of the body 35 are bearing balls 42 which take the thrust placed on the spindle 39.

Supported by the bearing 33 is a secondary or grounded electrode 45. The grounded electrode 45 has a vertical pipe 46 which is attached at 47 to the upper end of the spindle 39 and extends through an opening 49 in the lower wall 25 of the live electrode 22. The spindle 39 has a passage 48 formed therethrough which connects the pipe 46 to the vertical leg 32 of the emulsion inlet pipe 29. The upper end of the vertical pipe 46 is provided with a cross fitting 56 to which radially extending arms or spokes 57, 58, 59 and 60 are attached. I provide four spokes but more or less may be provided if desired. These spokes 57 to 60 inclusive rest in a horizontal plane located near the center of the treating space 27. The outer end of the spoke 57 is provided with a nozzle 61 which is shown in detail in Fig. 4. The nozzle 61 has a spout portion 62 which directs the emulsion at right angles to the radial line on which the spoke 57 is extended. The outer ends of the spokes 58, 59 and 60 are closed by caps 63. The spoke 58 carries a nozzle 64 which is on a slightly shorter radius than the nozzle 61, the spoke 59 carries a nozzle 65 which is on a shorter radius than the nozzle 64, and the spoke 60 carries a nozzle 67 which is on a shorter radius than the nozzle 65. The nozzles 61, 64, 65 and 67 are placed in different radial distances so that emulsion introduced into the treating space 27 will be equally distributed throughout the treating space.

Connected to the clean oil take-off pipe 16 is a feed back pipe 70 having a valve 71, which pipe 70 is connected to a pump 72. The pump 72 is connected by a pipe 73 having a valve 74 to the emulsion inlet pipe 29. A pipe 75 having a valve 76 is connected to the side of the tank 11 and also to the feed back pipe 70. The pipe 75 is adapted to withdraw partly cleaned oil from the tank. Connected to the lower part of the cone 12 of the tank 11 is a water take-off pipe 78 having a valve 79, which pipe 78 is connected to the feed back pipe 70. The purpose of this pipe 78 is to withdraw water from the lower part of the tank 11.

The live and grounded electrodes 22 and 45 are connected in an electrical circuit in which a secondary 80 of a transformer 81 is included. One side of the secondary 80 is connected by a wire 82 to the tank 11, which tank 11 may be grounded as indicated at 83. The grounded electrode 45 is connected to the tank 11. The other side of the secondary 80 is connected by means of a conductor 86 which is extended through an inlet bushing 87 supported by the tank 11 and is connected to the rod 20. The live electrode 22 is thus connected to one side of the secondary 80 of the transformer 81.

The operation of this invention is substantially as follows:

The valves 14, 74, 76 and 79 are closed and the valves 17 and 30 are open. Emulsion passes through the emulsion inlet 29 and passes through the bearing 33 to the grounded electrode 45. The emulsion passes outward through the arms 57 to 60 inclusive of the grounded electrode 45 and is injected into the treating space 27 by means of the nozzles 61, 64, 65 and 67. An electric field is at this time present in the treating space 27. The emulsion is equally distributed to all parts of the treating space 27 by reason of the arrangement of the nozzles on different lengths of radii. The reaction of the emulsion issuing from the nozzles causes the grounded electrode 45 to rotate in the direction of the arrow 89 of Fig. 2. The grounded electrode 45 is rotated by the principle of the common reaction wheel.

The electric field in the treating space 27 is a revolving electric field by reason of the fact that the grounded electrode 45 revolves. It will be seen that the maximum intensity of field follows the spokes 57 to 60 inclusive as they move in the treating space; therefore, the treating space will have four high potential gradient zones which rotate. The emulsion is subjected to the action of the electric field and the water particles are coalesced into masses which gravitate from the oil. The water falls to the bottom of the tank 11, the level thereof being indicated by the broken line 87 of Fig. 1. The water may be withdrawn by opening the valve 14 in the pipe 13. Dry or clean oil is removed from the upper end of the tank 11 by means of the pipe 16.

The important part of the electrode arrangement is first that the emulsion is constantly agitated by the streams of emulsion issuing from the nozzles. I have found, as previously pointed out, that the treatment is more effective if the emulsion is agitated while being subjected to the action of the electric field. The arrangement of the nozzles is important because the emulsion is equally distributed to all parts of the treating space 27. A further important result of the arrangement of the electrodes is that a revolving field is set up. As pointed out heretofore the emulsion will be subjected alternately to a high potential gradient field and then to a very low potential gradient field. This character of field is very effective in coalescing the water particles. Another advantage of providing a rotating field is that it absolutely prevents any wet spots from accumulating at any place in the treating space 27. This might occur if the electrodes were stationary.

The use of a screen live electrode is desirable, since it permits the treated oil and the water particles to pass outward in different directions and prevents the accumulation of gas in the treating space 27. It should be understood that the live electrode may be grid-work or any material perforate.

If the emulsion to be treated is very heavy, the coalescing of the water particles is comparatively difficult. When such heavy emulsion is to be treated I open the valve 71 in the feed back pipe 70 and the valve 74 in the pipe 73 and set the pump 72 in operation. Cleaned oil is withdrawn from the clean oil take-off pipe 16 and is mixed with the heavy emulsion passed through the emulsion inlet 29. If an emulsion having but little free water is to be treated I may open the valve 16 and send partly treated oil into the emulsion inlet 29 or I may open the valve 79 and send water into the emulsion inlet 29. The mixing of partly treated oil or water supplies the free water which is very necessary to an efficient dehydration of emulsion. In event that the feed back liquid, that is, the oil or the water is not thoroughly mixed with the emulsion to be treated in the pipe 29, upon reaching the treating space 27 where the emulsion is agitated, a thorough mixture will be accomplished.

I claim as my invention:

1. In a dehydrator, the combination of: a tank; a stationary outer electrode enclosing a treating space; a rotary fluid-conveying inner electrode; reaction nozzles carried by said inner electrode; an inlet pipe for conveying fluid under pressure to said inner electrode so that the discharge of said fluid from said nozzles into said treating space effects a rotation of said inner electrode, said nozzles being arranged to discharge in different concentric paths to promote agitation of the fluid in said treating space; means for impressing an electromotive force between said electrodes; and means for withdrawing fluid from said tank.

2. A stationary electrode for a dehydrator, consisting of a box-like foraminous member defining an electrically closed treating chamber with the exception of an opening in one wall.

3. A rotary electrode for a dehydrator, consisting of a tubular member having a plurality of radial arms provided with reaction discharge nozzles, said nozzles being arranged each to discharge in a different concentric path.

4. In a dehydrator, the combination of: walls defining a flat treating space; an electrode extending into said treating space and rotatable therein, said electrode including a plurality of hollow arms to which nozzles are attached at different radial distances from the axis of rotation of said electrode; means for forcing a fluid under pressure through said arms and nozzles during the rotation thereof; and means for establishing an electric field between said walls and said electrode.

5. In a dehydrator, the combination of: a primary electrode having a flat foraminous wall; a plurality of arms extending adjacent said wall, said arms forming a part of a rotatably mounted secondary electrode; means for supporting said electrodes in a body of liquid; means for establishing an electric field between said electrodes; and nozzles on said arms and positioned at different radial distances from the axis of rotation of said secondary electrode and adapted to direct a fluid supplied thereto under pressure into said liquid in concentric paths as said secondary electrode rotates.

6. In a dehydrator, the combination of: a tank; a primary electrode comprising flat foraminous upper and lower wall joined to a cylindrical wall, said lower wall having a relatively small opening therethrough; a pipe extending through said opening; arms secured to said pipe and in communication therewith, said arms extending between said upper and lower walls; nozzles on said arms and spaced unequally from said pipe, said pipe, said arms and said nozzles comprising a secondary electrode; means for setting up an electric field between said electrodes; and means for supplying a fluid to be treated to said pipe.

7. In a dehydrator, the combination of: a tank; a flat foraminous member supported horizontally in said tank and electrically insulated therefrom, said member forming a live electrode and extending a substantial distance across said tank; a grounded electrode rotatably mounted immediately below said live electrode, said grounded electrode providing a plurality of nozzles disposed at different radial distances from the axis of rotation thereof; means for establishing an electric field between said electrodes; and means for forcing a fluid through said nozzles during the rotation thereof.

8. In a dehydrator, the combination of: a grounded tank; a flat horizontal interstitial wall extending across said tank and insulated therefrom to form a live electrode; a grounded electrode spaced above said live electrode and cooperating therewith in providing a treating space in which an emulsion is positioned; and means for establishing an electric field between said electrodes for agglomerating the water particles of said emulsion into drops of sufficient size to settle through the interstices of said live electrode and accumulate in a body in the bottom of said tank to define a water surface whereby said means sets up an auxiliary field between said live electrode and said water surface.

9. In an electric treater, the combination of: a tank the interior of which provides a settling space; means for establishing an electric field in a portion of said tank; inlet means for introducing into said electric field the oil-and-water emulsion to be treated, said field agglomerating the water particles, said agglomerated water particles dropping to the bottom of said tank to form a continuous water phase, the dry oil rising to the top of said tank and forming a continuous oil phase; means including a pump communicating with a plurality of levels in said tank for withdrawing fluid therefrom and delivering it to said inlet means; and valve means for controlling the amount of fluid respectively withdrawn from said different levels.

10. In an electric treater, the combination of: a tank the interior of which provides a settling space; means for establishing an electric field in a portion of said tank; inlet means for introducing into said electric field the oil-and-water emulsion to be treated, said field agglomerating the water particles, said agglomerated water particles dropping to the bottom of said tank to form a continuous water phase, the dry oil rising to the top of said tank and forming a continuous oil phase; a pump means discharging into said inlet means; and means for supplying fluid to said pump means, said means comprising an upper valved pipe means communicating with the dry oil in the upper end of said tank, a lower valved pipe means communicating with said water in the lower end of said tank, and an intermediate valved pipe means communicating with the intermediate portion of said tank.

In testimony whereof, I have hereunto set my hand at Los Angeles, California, this 22nd day of November, 1926.

WILLIAM O. EDDY.